United States Patent
Nam

(10) Patent No.: US 7,055,261 B2
(45) Date of Patent: Jun. 6, 2006

(54) VERSATILE MEASUREMENT DEVICE FOR THREE DIMENSIONS

(76) Inventor: Daehwi Nam, 5311 Skillman Ave., Apt. 1R, Queens, NY (US) 11377

( * ) Notice: Subject to any disclaimer, the term of this patent is extended or adjusted under 35 U.S.C. 154(b) by 114 days.

(21) Appl. No.: 10/886,112

(22) Filed: Jul. 7, 2004

(65) Prior Publication Data
US 2006/0005416 A1 Jan. 12, 2006

(51) Int. Cl.
*G01B 3/10* (2006.01)
*G01B 3/56* (2006.01)

(52) U.S. Cl. .............. 33/760; 33/761; 33/768; 33/534

(58) Field of Classification Search ............... 33/27.02, 33/27.03, 755, 759, 760, 761, 768, 534
See application file for complete search history.

(56) References Cited

U.S. PATENT DOCUMENTS

| | | | |
|---|---|---|---|
| 1,916,609 A * | 7/1933 | Emmons ...................... 33/534 |
| 2,463,126 A * | 3/1949 | Sneva ......................... 33/534 |
| 2,676,414 A * | 4/1954 | Derry .......................... 33/534 |
| 2,920,392 A * | 1/1960 | Stromquist ................... 33/534 |
| 3,651,574 A * | 3/1972 | Burkart ........................ 33/760 |
| 4,440,168 A * | 4/1984 | Warren ........................ 33/534 |
| 4,965,944 A * | 10/1990 | Kuze et al. ................... 33/760 |
| 5,077,910 A * | 1/1992 | Smith .......................... 33/760 |
| 5,390,425 A * | 2/1995 | Gilberts ....................... 33/768 |
| 5,782,007 A * | 7/1998 | Harris ......................... 33/768 |
| 2002/0088135 A1* | 7/2002 | Arlinsky ...................... 33/760 |
| 2004/0237326 A1* | 12/2004 | Wang .......................... 33/760 |

\* cited by examiner

*Primary Examiner*—G. Bradley Bennett
(74) *Attorney, Agent, or Firm*—Steven Horowitz

(57) ABSTRACT

A ruler specifically designed to measure locations in three dimensions. The device contains a flat base upon which the device rotates and pivots along a horizontal plane. The measuring tape also can be projected out of its holder at a range of angles in a third dimension. The device includes a marking means at the end of the tape, an arced tape cross-section for lengthy extensions and a level comprised of a water bubble in a box at a top portion of the housing of the device in the rear. The tape has a movable second center upon which the device can pivot so the marker at the end of the tape can mark arcs. The housing has a series of sections denoting amounts of rotational degrees.

23 Claims, 8 Drawing Sheets

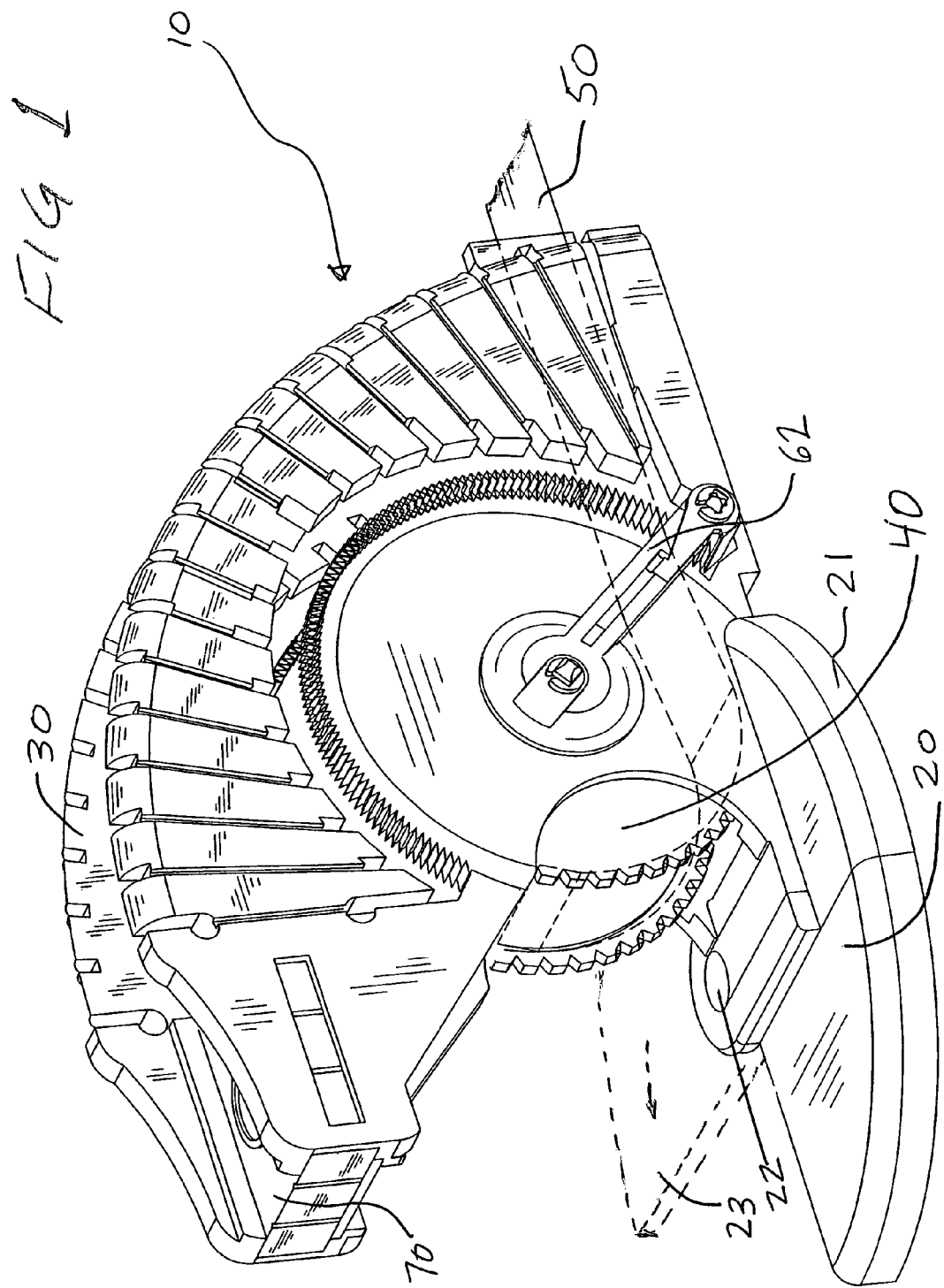

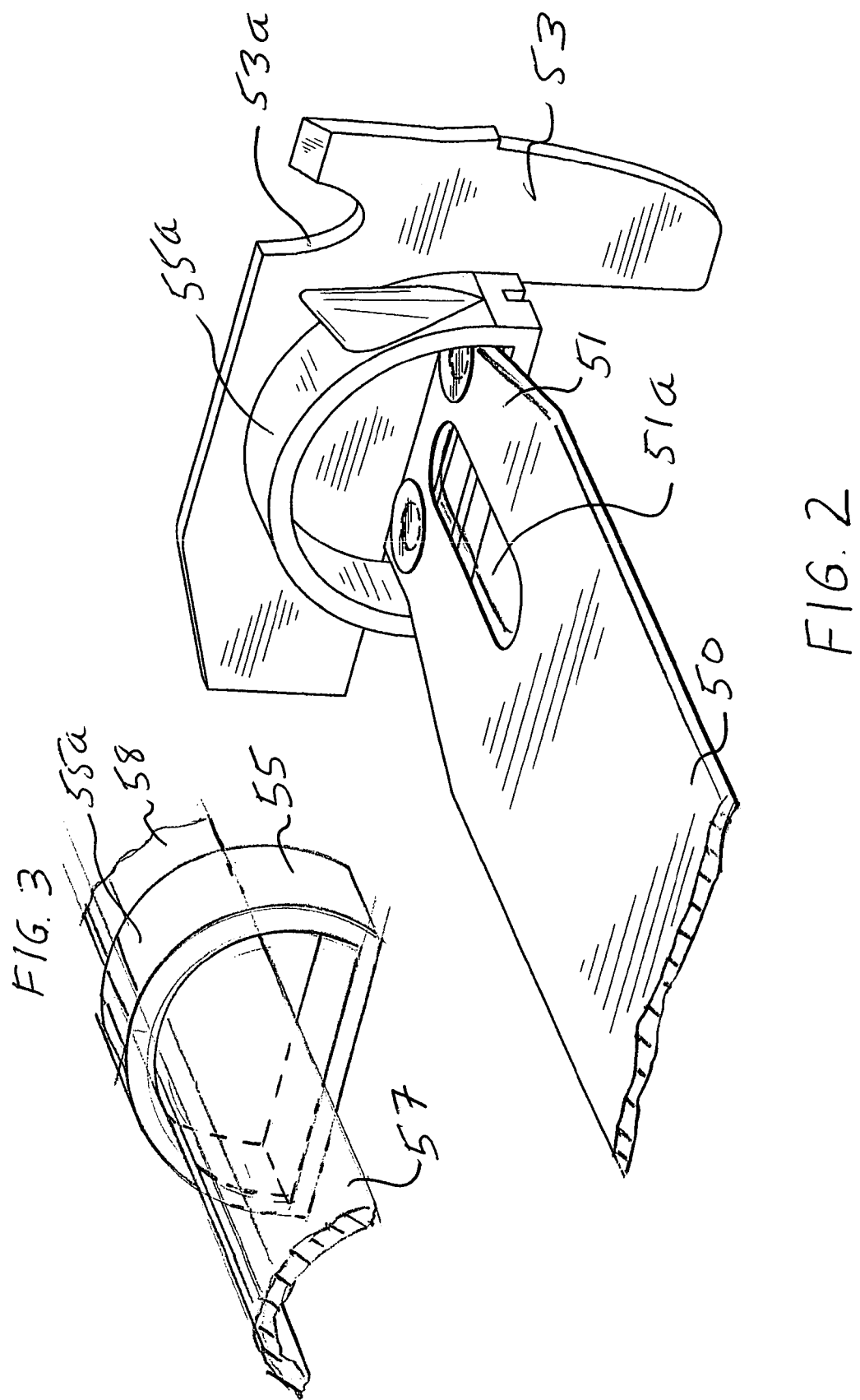

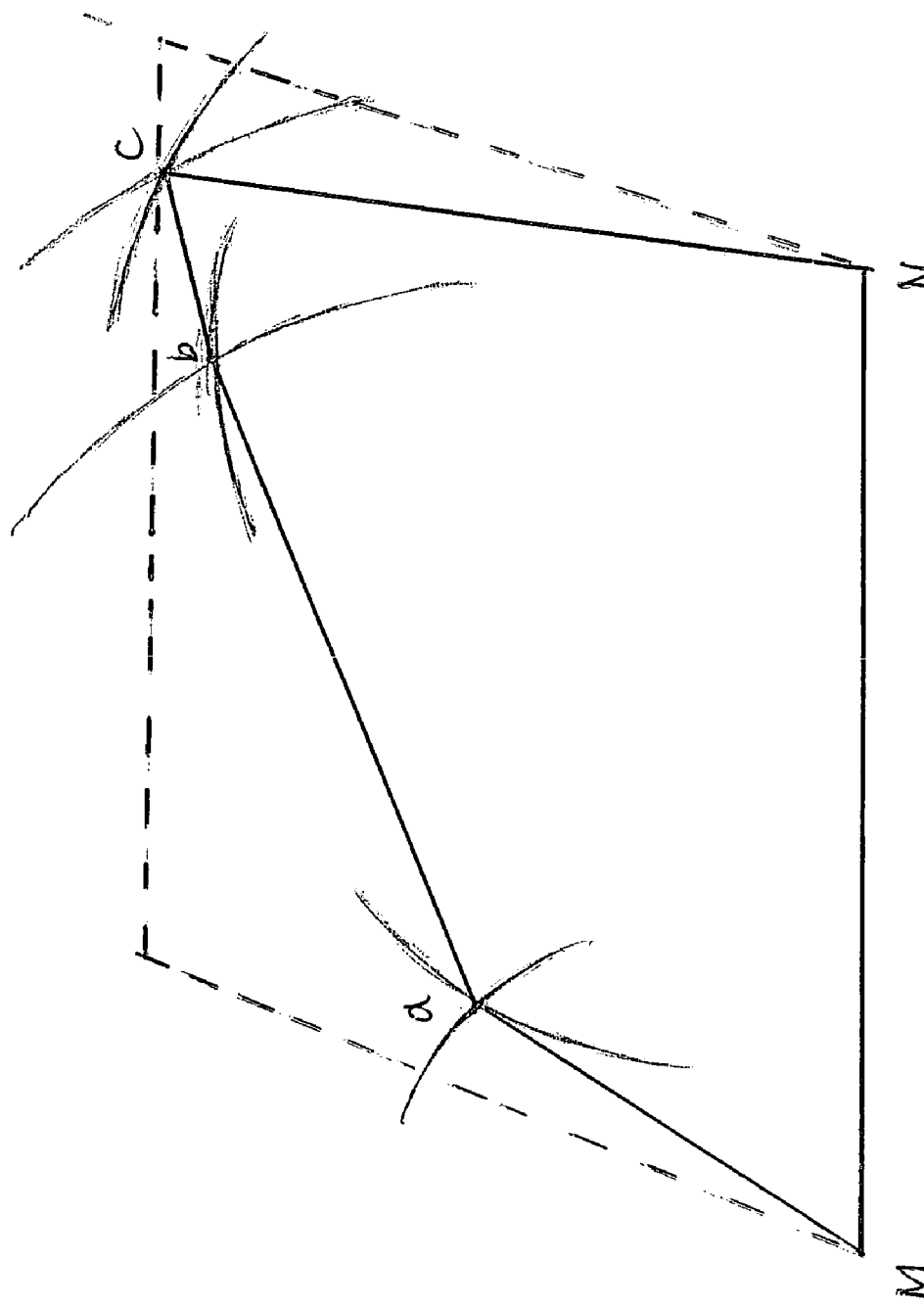

VERSATILE MEASUREMENT DEVICE FOR THREE DIMENSIONS

FIELD OF THE INVENTION

The field of this invention is measuring devices, and more particularly, such devices that can measure points in three dimensions.

BACKGROUND OF THE INVENTION AND DISCUSSION OF THE PRIOR ART

During the construction of various structures and objects, large and small, including whole buildings and parts thereof, it is necessary to measure off distances. It is also frequently necessary during construction to mark or draw parallel lines. Further, it is often necessary to have access to some device for marking off an arc or circle.

For example, when constructing paneling for the corner of a ceiling one needs to construct the paneling so that it corresponds to the actual dimensions of the ceiling. As seen in FIG. 9, it is often the case that the borders are not at ninety degrees to one another. In order to mark off the shape of the five-sided polygon in the corner of the ceiling onto the substance to be cut if, the carpenter or worker needs to denote points a, b and c shown in FIG. 9. First length M to N is measured. Then one measures out three lines to each of these three points from point M and three lines to each of three points from point N. When these lines are measured out one forms an arc at the end of the line. Thus, as shown in FIG. 9, points a, b and c are then defined by the intersection of the arcs.

In addition, in the construction of objects it is often necessary to measure things outside of a horizontal plane, that is, in three dimensions. In such cases, an ordinary ruler suitable for ordinary two dimensional measuring may be inadequate or not particularly adept, especially if time is a factor and the measurements need to be done frequently.

Suppose, for example, that one wanted to construct or fix a shelf of a bookcase. Nails or bolts have to be inserted into the bookshelf from the back of the bookcase toward its front where the shelf is. When the carpenter or worker is at the back of the bookshelf he or she does not see the bookshelf. Hence, guide lines have to be marked on the back of the bookcase corresponding to the location of the bookshelf. Since the top of the bookcase is a straight line that is parallel to the horizontal guide line that the worker needs to draw, the worker will place the ruler perpendicular to the top of the bookcase with the edge of the ruler corresponding to the top edge of the bookcase and the bottom of the ruler at a point along the proposed guide line to be drawn. Then the worker, keeping the ruler in that position, can try to move the ruler horizontally while marking off a line along the bottom edge of the ruler to form the desired guide line.

This process of trying to draw a line parallel to a existing line, i.e. to mark off a continuum of or a series of points parallel to the top edge of the bookcase, is obviously cumbersome and imprecise. It would be useful if a measuring device incorporated a marking device and was specifically designed so that it could more easily be used to mark off a guide line parallel to an existing line efficiently and more precisely. Thus there is a need for a measuring device that incorporates means to render making a single or a series of parallel lines easy to draw.

In addition, certain objects are particularly suited for a ruler that can measure in three dimensions. These kinds of objects can be anything including a round table or human sculpture. Suppose, for example, the sculptor or person building the sculpture wishes the arms of the human body to have a certain angle from the torso. There is a need for a measuring device that can be used to accomplish this including measuring the appropriate angle. In addition, round tables, sculptures and other such objects inevitably require correct measurements performed in three-dimensional space. It would be useful to have a measuring device that can tackle measuring things in that environment.

Rulers useful for three dimensional measurements are known but they are typically complex and expensive. For example, three-dimensional measuring devices that operate by lasers are well known. There is a compelling need for a measurement device that is not complicated to manufacture or use and that is not expensive and that is still suitable for tackling the task of measuring things in the environment of three dimensions. Furthermore, there is a need for such a device that can be useful in a wide range of construction projects including for short and long distances.

Certain construction involves repeated multiple measurements of lengths or locations that would be useful to remember. Often, the carpenter or person doing the construction does not have handy access to paper or a means of recording the measurements. It is also difficult and risky to rely on one's memory to remember three or more multiple distances (which distances may even be repeated) when a place to easily record them is not always available. It would also take up time to record them on paper or otherwise. Thus another important need during construction that involves multiple measurements is the need to have a practical way to temporarily record measured lengths retain without having to constantly write them all down.

When measuring things in environments that include points outside a two-dimensional plane, i.e. three-dimensions, it is necessary to be precise about the location of the measuring device in three-dimensional space. There is a need for a measuring device that is precise enough to meet this requirement.

When measuring objects it is often necessary to measure out lines and surfaces relative to a horizontal plane of a floor. Thus it is often necessary to make use of a level during construction. Carrying multiple devices is cumbersome and less efficient. Thus there is a need to have a measuring device that can incorporate a level in a manner that the level can really be used as needed.

There is also a need for a measuring device that incorporates all features needed in the construction of a wide variety of objects. There is a further need for such a measuring device to incorporate convenient means for holding a writing utensil.

The present invention accomplishes all of the above objectives and more.

SUMMARY OF THE PRESENT INVENTION

The present invention accomplishes the above requirements as well as many others by offering a relatively simple ruler designed to be adept at measuring a wide variety of objects, including objects located out of a single horizontal plane. The device contains a flat base upon which the device rotates and pivots along a horizontal plane. In dependent of that movement, the measuring tape of the device also can be projected out of its holder at a range of angles in a third dimension. The device includes several other features including a marking means at the end of the tape, an arced tape cross-section for lengthy extensions and the incorporation of a level. The latter feature is comprised of a water bubble contained in a box at a top of the device in the rear. The device also features a second pivot point along the tape created by moving a movable pivot from the distal end of the tape closer to the housing. This permits the user to mark off arcs as needed like a compass would.

IMPORTANT OBJECTS AND ADVANTAGES

The following important objects and advantages of the present invention are:
(1) to provide a measuring device that allows speedy measurements to be taken during construction or fixing of any object;
(2) to provide a measuring device that allows the user to make precise measurements efficiently;
(3) to provide a measuring device that is very well adapted for measuring and constructing objects that have curved contours;
(4) to provide such a measuring device that can measure distances in both two-dimensional and three-dimensional space;
(5) to provide such a measurement device that is useful for measuring during indoor or outdoor construction;
(6) to provide a measuring device that can be used to speedily and conveniently measure at least three lengths without having to record each measurement and start from the beginning for each measurement;
(7) to provide such a measurement device having a built-in level with a water bubble;
(8) to provide such a measuring device that can be used to ensure that the device is sitting at the predetermined level position in three-dimensional space;
(9) to provide for such a device that can be used to ensure that any object being measured is sitting flat or that any horizontal line is not tilted;
(10) to provide such a device that includes a tape with a marking instrument for tracing a line to record a distance;
(11) to provide such a device including a tape measuring element that has the ability to assume a curved cross-section in order that it can be extended for long distances without sagging;
(12) to provide such a device including a tape whose edge can be useful for marking lines when it remains flat and its cross-section is not curved;
(13) to provide such a ruler without any bolts;
(14) to provide such a ruler whose housing is made of aluminum;
(15) to provide such a three-dimensional measuring device that is relatively simple to manufacture and operate;
(16) to provide such a ruler that can record long distances;
(17) to provide such a ruler that includes a tape having a movable pivot to create a second center or pivot with which to mark off or measure an equidistant arc or other point or collection of points from the second center or pivot;
(18) to provide such a measuring device that has a base that rotates up to 180 degrees in a two dimensional plane and a tape that can rotate up to 90 degrees in a third dimension thereby allowing measurement of any point in a three-dimensional space; and
(19) to provide such a measurement device that affords manual control of the rotation and extension of the tape;
(20) to provide a measuring device that incorporates a ruler, a level and a compass;
(21) to provide a measuring device that also includes a marker that can be used for drawing parallel lines;
(22) to provide a versatile measuring device that incorporates many useful features used in the construction of objects;
(23) to provide such a ruler that includes means for retaining a pencil or other writing instrument;
(24) to provide a measuring device that incorporates a means for temporarily recording measured lengths without having to write them down;
(25) to provide such a measuring device that provides a practical way for a user of the device to measure three lengths within a short time without having to record the lengths; and
(26) to provide a measuring device whose physical structure allows the user to measure angles.

BRIEF DESCRIPTION OF THE DRAWINGS

FIG. 1 is a side perspective view of the ruler of the present invention;

FIG. 2 is a fragmentary perspective view of one end of the tape in the ruler of the present invention upside down and from another side;

FIG. 3 is a fragmentary perspective view of the tape in the ruler of the present invention upside down in curled position;

FIG. 9 is a sketch of a polygon measured out onto material used during construction.

DETAILED DESCRIPTION OF THE PREFERRED EMBODIMENT

Figure 4:
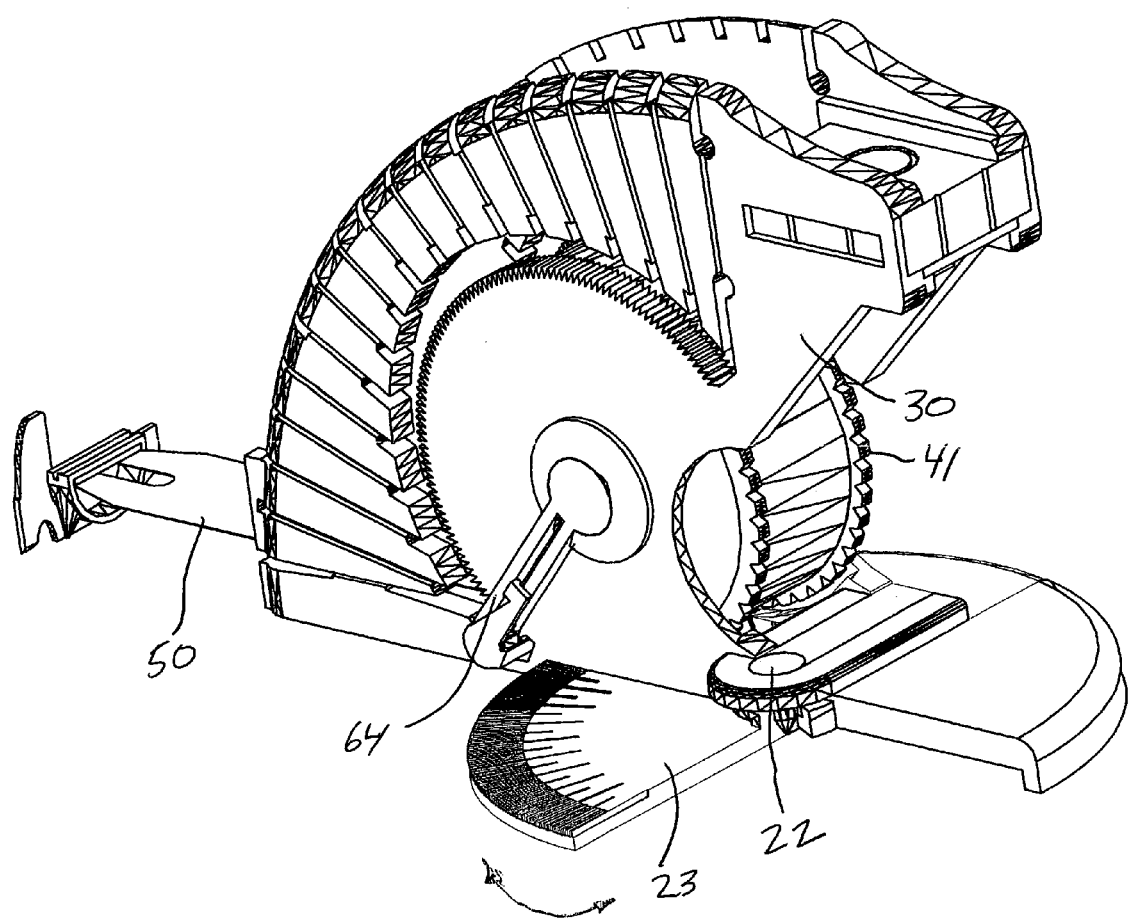
FIG. 4 is a perspective view of the ruler of the present invention from another side.

The apparatus of the present invention will now be illustrated by reference to the accompanying drawings. The ruler of the present invention has been assigned reference numeral 10. Other elements have been assigned the reference numerals referred to below.

In the claims of this patent application, the term "approximately 180 degrees" is a broad term intended to encompass a rotational degree of between approximately 120 degrees and approximately 210 degrees. The term "approximately 90 degrees" is a broad term intended to encompass a rotational degree between approximately 60 degrees and approximately 120 degrees.

As seen from FIGS. 1–8, the present invention is a versatile ruler 10 that incorporates a compass and marker and is designed to measure things in any environment including in three dimensions. As best seen in FIG. 1 and FIG. 4, ruler 10 includes a flat base 20, the flat base 20 including a substantially semi-circular flat base cover 21 that covers and houses therein a semi-circular compass 23. The flat base 20 includes a centrally located pivot 22 attached to base cover 21 and compass 23 so that the base 20 and base cover 21 rotate around pivot 22 and pivot 22 is connected to housing 30. The compass 23 inside base cover 21 rotates on pivot 22 and is exposed when it emerges out of base cover 21. The housing 30 above the base 20 also rotates alternatively in either direction around the pivot up to approximately 180 degrees in a two-dimensional plane parallel to and above the plane that the compass 23 rotates in. Compass 23 contains standard marking lines for denoting equidistant (and non-equidistant) units of measurement. By rotation of the compass 23 relative to the pivot 22 or by rotation of the housing 30 and base cover 21 on pivot 22 in either direction through a horizontal plane of approximately 180 degrees, compass 23 can be presented in its entirety.

Compass 23 is substantially semi-circular, although the present invention envisions alternative embodiments in which compass 23 may differ in shape yet still perform the functions of a compass used by engineers in that it measures direction, angular rotation, etc.

Figure 5:
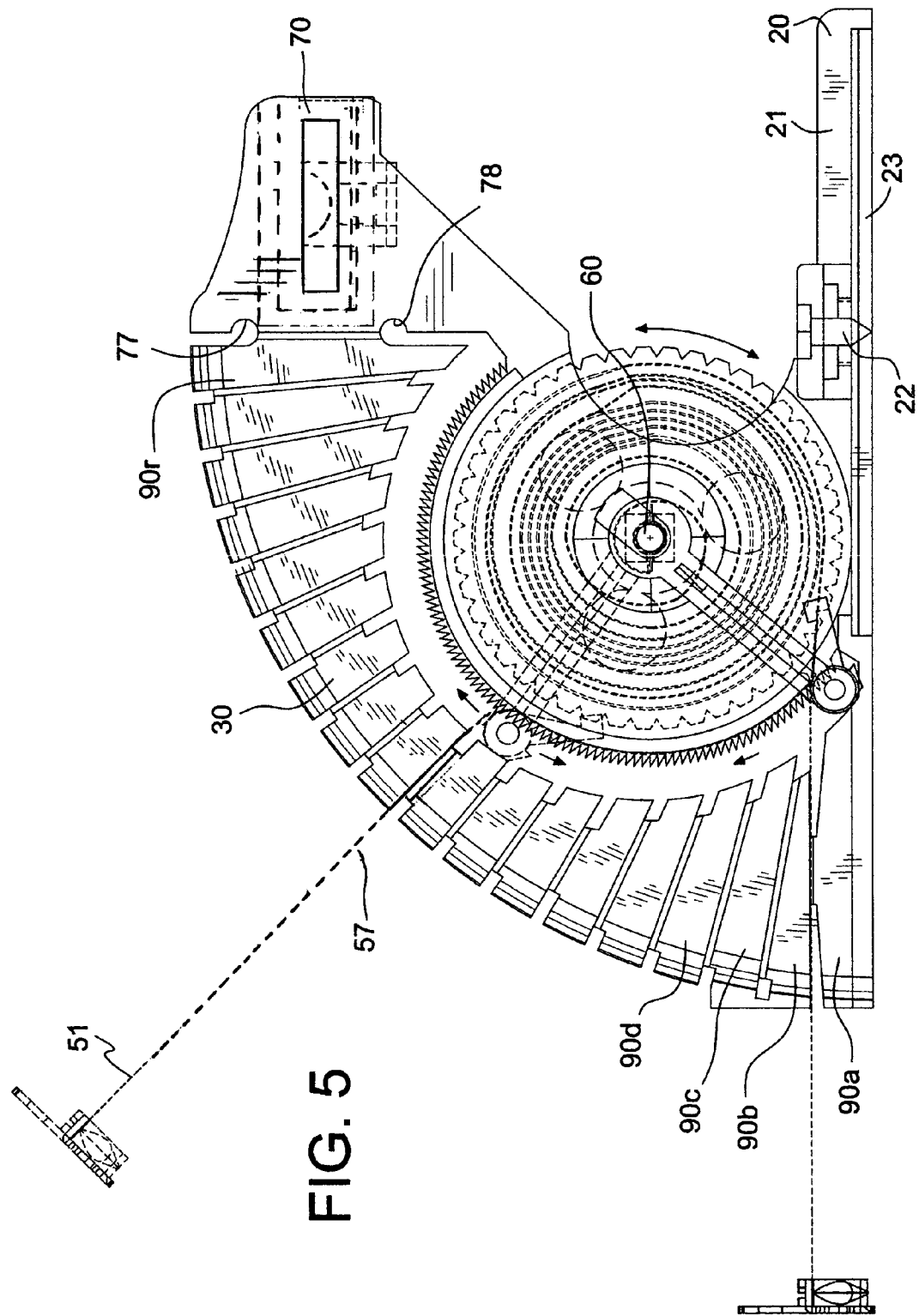
FIG. 5 is a side elevational view of the ruler of the present invention showing various positions of the tape thereof.
Figure 6:
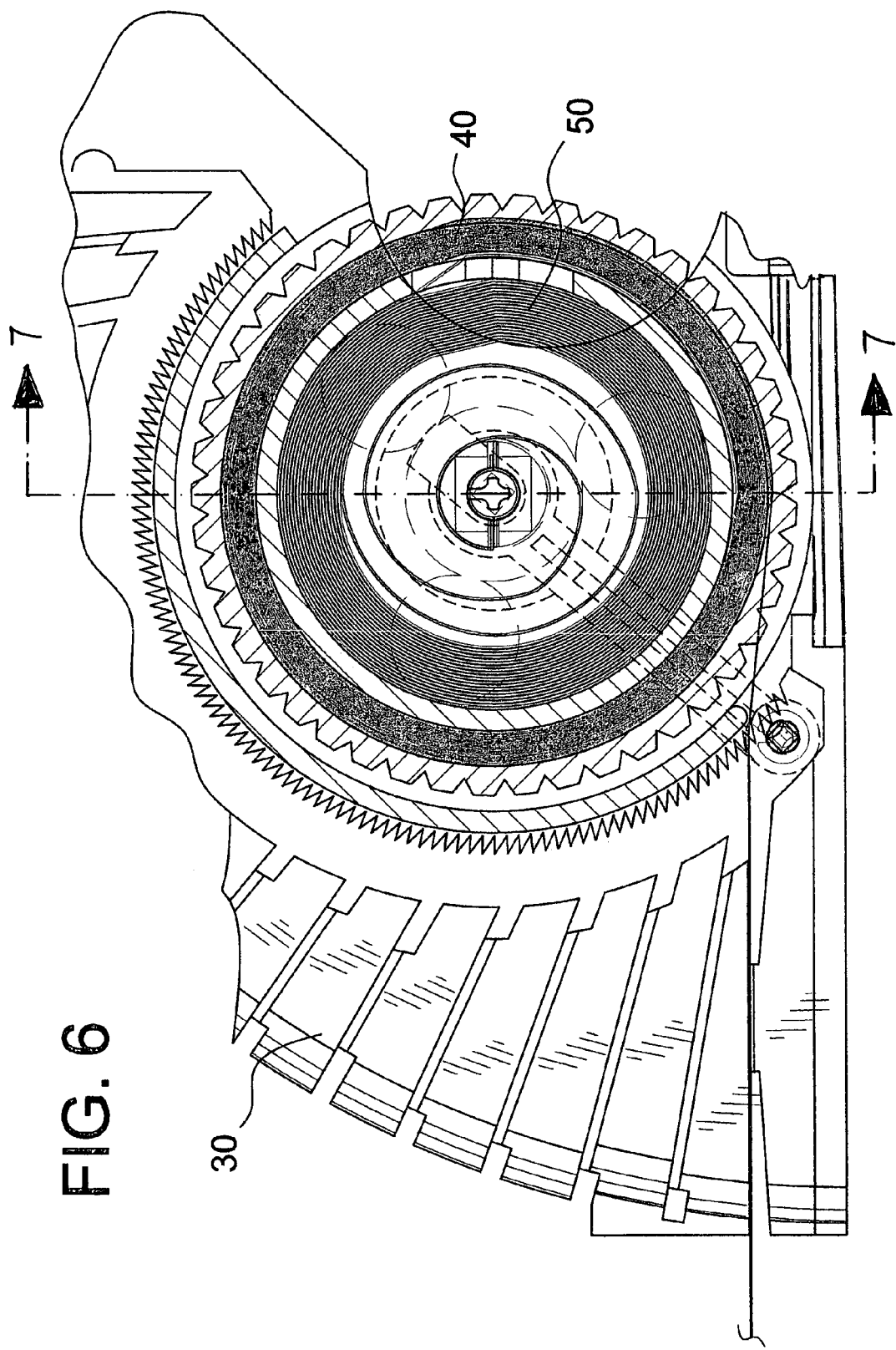
FIG. 6 is an enlarged vertical sectional view taken through the coiled tape.
Figure 7:
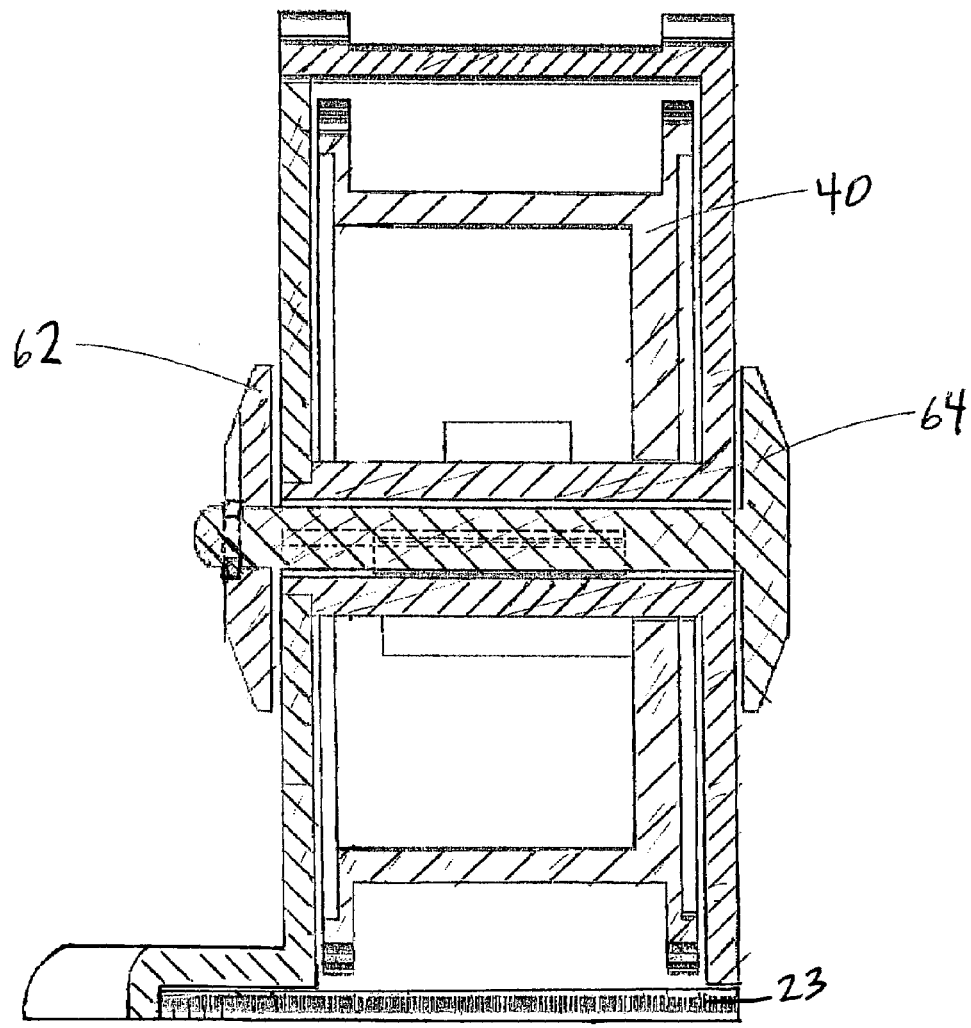
FIG. 7 is an enlarged sectional view taken along line 7—7 of FIG. 6.
Figure 8:
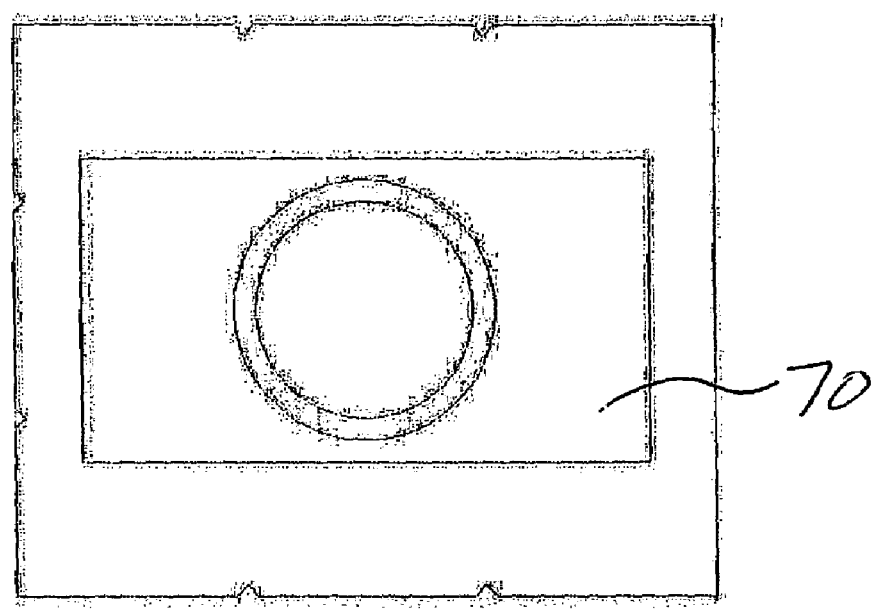
FIG. 8 is a top view of the level used in the ruler/measuring device of the present invention.

As explained further below, tape 50 contains standard markings of units of measurement and tape 50 can be projected out of housing 30 and extended horizontally to measure any point in two dimensions. The zero point for these markings would be the distal end 51 of tape 50. Furthermore, as best seen in FIGS. 1, 4 and 5, and as explained further below, tape 50 can also be rotated so that it can extend outside a horizontal plane and into three dimensional space thereby allowing ruler 10 to measure any point in three dimensions as well.

As noted, ruler 10 includes a general housing 30 preferably made of aluminum or other lightweight but rigid material. Housing 30 includes at a bottom thereof the flat base cover 21 so that housing 30 can mate with and rotate around pivot 22 of base 20. Although flat base cover 21 is integral with housing 30, forming a bottom portion thereof, flat base cover 21 can also be thought of conceptually as forming part of base 20 along with compass 23 and pivot 22. Ruler 10 also includes a drum 40 preferably made of plastic, and a coiled tape 50 preferably made of iron housed inside drum 40. Ruler 10 also includes tape 50 that is coiled inside drum 40 and which can be pulled in an uncoiling direction and extended out of housing 30. As noted, tape 50 has thereon measuring indicia such as lines denoting distances in inches, centimeters, etc.

Rotation of the tape 50 is accomplished preferably through manual manipulation of arms, as follows. Axle member 60, which is typically elongated and centered in the drum 40 and tape 50, has a first arm 62 at a first end of axle member 60 and has second arm 64 at a second end of axle member 60. Axle member 60 runs through drum 40 and the coiled tape 50, the first arm 62 extending outside a first side of the housing and the second arm 64 extending outside a second side of the housing 30. Since it can be envisioned that ruler 10 can function with only a single arm, first arm 62 is sometimes referred to as the at least one arm 62.

As seen in FIGS. 2–3, tape 50 can be extended more than otherwise without sagging due to its "U"-shaped cross-section of tape 50 that it acquires from the pressure on the side edges of tape 50 making tape 5 bend when movable pivot 55 is moved away from the relatively narrow distal end 51 towards the wider proximal segment 57 of tape 50.

In ruler 10, tape 50 is capable, in a preferred embodiment, of rotating up to approximately 90 degrees (in a third dimension) at an angle to the horizontal plane of base 20. The amount of the angular rotation of tape 50 can be readily adjusted simply by manipulating the first arm 62, the second arm 64 or both arms 62, 64 of axle member 60. Tape 50 stays in place in a locked position in its rotated position angled from the horizontal plane of the base 20 in the third dimension as a result of the teeth 41 of drum 40 being engaged with spaces on the portion of housing 30 that is adjacent the outer surface of drum 40 and as a result of the degree of rotation being controlled by arms 62, 64 having anchors or anchor portion thereof. Once rotated, tape 50 can then be extended outward to a point distal from the base 20 in an amount desired subject to the length of the coiled tape 40. Coiled tape 40 uncoils as it is extended.

Drum 40 can also be directly manipulated by the user to control length of tape 50.

Although ruler 10 contains compass 23 within its base 20, tape 50 of ruler 10 also has the ability to function as a compass, which renders ruler 10 still more versatile. It should be understood that centrally locate pivot 22 represents a first center. As explained however, a second center 55 is also available using ruler 10. Tape 50 is essentially segmentable in the sense that tape 50 has a movable pivot 55, sometimes called a movable alternative center 55 or second center (to distinguish it from the first center located in the middle of the base 20. The movable pivot or second center 50 can travel in either direction along the length of tape 55 up to housing 30. This affords device 10 with the extra capability of performing the function of a compass. When tape 50 is extended, movable pivot 55 can be situated at a certain point before the end of the tape 50 thereby dividing tape 50 into a proximal segment 57 and a distal segment 58. When movable pivot 55 is set down in a fixed position, tape 50 can be held at the second center 55 while distal segment 58 and the rest of device 10 can be rotated around pivot bottom 55a of movable pivot 55 to employ marker 53 of distal end 51 of tape 50 to mark off an arc and measure a plurality of or a collection of points equidistant from movable pivot 55. More specifically, distal segment 58 of tape 50 can rotate around movable pivot 55 by holding second center 55 on one hand and holding marker 53 at the end of tape 50 in the other hand and then rotating the device 10 by moving both hands thereby marking off an arc representing a collection of points equidistant from second center 55. When holding second center 55 to create a pivot point it is pointer 55a of second center that is used as the actual physical pivot point.

Tape 50 has at its distal end 51 an indented or carved out area 51a. This carved out area 51a or hole 51a assists in maintaining the curved "u"-shaped cross-section of tape 50. Opposite marker 53 at distal end 51 of tape 50 is a control area 59 jutting out of distal end 51 for manipulating distal segment 58. As best seen in FIG. 2 and FIG. 3, distal end 51 of tape tapers off and is narrow so that the semi-circular second center 55 can grip the end of the tape 50 in a rest position. When desired second center 55 can be moved away from the distal end 51. As best seen in FIG. 3, as one moves second center 55 away from the narrower distal end 51 of tape, tape 50 is pressured and forced to curl up into a U-shaped cross-section.

The marker 53 attached to distal end 51 has an upper groove 53a thereon to hold a writing instrument such as a pen or pencil. It is also envisioned that other well known means can be used to fit or structure marker 53 so that marker 53 can write or make a mark.

Ruler 10 is also useful in the construction of objects that require the drawing or marking off of parallel lines. An example of this is the construction or fixing of shelves on a bookcase. Some sort of screw of bolt must be inserted into the bookcase that traverses the entire thickness of the back of the bookcase and that continues into some portion of the shelf. The screw of bolt may begin from the exterior of the back of the bookcase. However, from the perspective of one facing the back of the bookcase where the screw will be inserted it is not feasible or easy to see the shelf and hence it is not possible or easy to see the point along the height of the bookcase where the screw(s) should be inserted. In order to solve this problem a line parallel to the top of the bookcase is marked off running across the back of the bookcase at a point where screws traversing the thickness of the back of the bookcase could make contact with the shelf. Then, for next lower shelf a similar line parallel to the first line would be marked off. The ruler 10 of the present invention would make marking off such parallel lines much easier. For example, marker 53 can also be used to draw such a parallel line by putting marker at the top edge of the bookcase and moving second center 55 to the desired height of the bookshelf and then after attaching writing instrument to the second center 55 device 10 is moved across width of the bookcase while maintaining the marker at the end of the tape at the top of the bookcase.

Another way of marking parallel lines with ruler 10 is shown in FIG. 5. When tape 50 is rotated as close to the zero angle as possible, tape 50 is parallel to base 20. Thus a parallel line can be made along tape 50.

When it is necessary to build something in three dimension, it is often necessary to measure an angle. Using arms 62, 64 the user rotates tape 50 the point that corresponds to the angle in the physical object one is constructing and then puts a marker at that point. Tape 50 is rotated so that it is aligned with the edge of a section 90 of housing 30. Each section 90 of housing 30 represents a portion of the total ninety degree angle traversed by rotation across the total curvature of housing 30. When the tape reaches the ninety degree angle it is right on top of the first center which is pivot 22 of base 20.

Housing 30 has a series of sections on its exterior so that an arc traversing this series of sections consumes a specific amount of rotational degrees, for example ninety degrees. Housing 30 can be built in a variety of ways depending on the number of sections 90 and how wide each section should be but in general each section represents a portion of the total angular rotation that tape 50 traverses. Preferably, that total is ninety degrees but the present invention contemplates other larger or smaller total angles. The drawings hereto illustrate a situation where the total angle that tape 50 rotates across is ninety degrees and where each of the approximately eighteen sections 90a, 90b, 90c, 90d . . . 90r of housing 30 represents a 5 degree increment in angular rotation and thus add to 90 degrees total. Thus, to mark off a ninety degree angle, as best appreciated from FIG. 5, align the tape 50 at the last section of housing 30. In order to assure the most precise measurement of the ninety degree angle, the housing 30 near level 70 has two aligned circular notches 77, 78. It is contemplated by the present invention that although the drawings herein illustrate housing 30 as containing 5 degree increments, housing 30 can be constructed with sections denoting larger or smaller increments of angles, which would require different amounts of individual sections 90 of housing 30.

The lower edge of the second section 90b of housing 30 represents 10 degrees angular rotation. As a result of the width at the distal end of tape 50, ruler 10 only rotate beginning at an angle of at least 10 degrees to the base 20. Nevertheless, it is envisioned that persons skilled in the art can envision modifications whereby ruler 10 can measure angles at less than ten degrees of rotational angle upward from the base 20.

Device 10 is constructed so that tape 50 is aligned with a first center point at the pivot 22 of base 20. Thus, the measurement lines marked on tape 50 begin in an amount equal to the distance, e.g. 10 centimeters, between pivot 22 and the beginning of the part of tape 50 that extends outward. Thus an imaginary straight line running from distal end 51 of tape 50 along tape 50 and continuing through housing 30 and drum 40 would eventually hit pivot 22.

In order to ensure that base 20 and in fact the entire device 10 is sitting flat on the ground or on whatever, surface it is supposed to be sitting, ruler 10 includes level 70 that is located on a top portion of housing 30. In a preferred embodiment, level 70 is situated at or near a rear of said housing 30. Level 70 generally comprises a box containing water and a small amount of air in a manner well known by those skilled in the art to ensure that there is a movable air bubble that is centered when the device 10 is flat. The air bubble 72 would be observable from a top view of housing 30.

In using the device as a compass, the user holds the second center with one hand and with the other hand the user holds and moves the marker in the shape of an arc. Note that in holding the second center with the first hand the user is able to rotate the entire device 10 pivoted on the second center 55 since the tape device is rigid to write a curve.

The ruler 10 allows retention of three measured distances or locations in a practical way with only a modest amount of effort. For example, suppose you want to measure three lengths. First, you extend tape 50 and measure the first length which is x units, for example centimeters, and remember it. Then position ruler 10 so that you extend the tape 50 to measure the second point which turns out to be y centimeters. Using ruler 10 you can temporarily record the second measurement of y centimeters by simply placing the second center 55 along tape 50 at the point y centimeters and leaving it there. Then measure the third length from the end of the tape 50 as usual and place your hand at the result, z centimeters. In this way the user has easy access to three lengths, x, y, z without having to write anything down.

It is to be understood that while the apparatus of this invention have been described and illustrated in detail, the above-described embodiments are simply illustrative of the principles of the invention. It is to be understood also that various other modifications and changes may be devised by those skilled in the art which will embody the principles of the invention and fall within the spirit and scope thereof. It is not desired to limit the invention to the exact construction and operation shown and described. The spirit and scope of this invention are limited only by the spirit and scope of the following claims.

What is claimed is:

1. A versatile measuring device capable of measuring in three dimensions, comprising:
   a rigid housing including at a bottom thereof a base,
   a compass associated with the base capable of rotating around a pivot in a two-dimensional plane,
   a drum having a coiled tape inside the drum, the tape marked with units of measurement,
   the housing containing a series of sections on an exterior of the housing so that an arc traversing the series of sections covers a specific amount of rotational degrees, each section corresponding to a portion of the specific amount of rotational degrees,
   a driving member connected either to the tape or to the drum and accessible to a user,
   the tape capable of being extended outside said housing at a variety of angles by rotating up to approximately 90 degrees in a third dimension at an angle to the two-dimensional plane, an amount of the tape's rotation being adjustable by manipulation of the driving member.

2. The measuring device of claim 1, including a level on a top portion of the housing.

3. The measuring device of claim 1, wherein a distal end of the tape has a marker.

4. The measuring device of claim 3, wherein the marker has a groove for holding a writing instrument.

5. The measuring device of claim 1, wherein the compass is capable of rotating up to approximately 180 degrees.

6. The measuring device of claim 3, including a level on a top portion of the housing.

7. The measuring device of claim 1, wherein the driving member is an axle member having at least a portion of the drum and the coiled tape, the at least one arm extending outside a first side of the housing.

8. The measuring device of claim 7, wherein the axle member also has a second arm at a second end thereof, the second arm extending outside a second side of the housing, the amount of the tape's rotation being adjustable by manipulation of the first arm and/or the second arm.

9. A versatile measuring device capable of measuring in three dimensions, comprising:
   a rigid housing including at a bottom thereof a base a compass associated with the base capable of rotating around a pivot in a two-dimensional plane,
   a drum having a coiled tape inside the drum, the tape marked with units of measurement,
   the housing containing a series of sections on an exterior of the housing so that an arc traversing the series of sections covers approximately ninety rotational degrees corresponding to a portion of the ninety rotational degrees,
   a driving member connected either to the tape or to the drum and accessible to a user the tape capable of being extended outside said housing at a variety of angles by rotating up to approximately 90 degrees in a third dimension at an angle to the two-dimensional plane, an amount of the tape's rotation being adjustable by manipulation of the driving member.

10. The measuring device of claim 9, including a level on a top portion of the housing.

11. The measuring device of claim 9, wherein a distal end of the tape has a marker.

12. The measuring device of claim 10, wherein the marker has a groove for holding a writing instrument.

13. The measuring device of claim 11, including a level on a top portion of the housing.

14. The measuring device of claim 9, wherein the compass is capable of rotating up to approximately 180 degrees.

15. The measuring device of claim 9, wherein the driving member is an axle member having at least one arm at a first end thereof, the axle member rubbing through at least a portion of the drum and the coiled tape, the at least one arm extending outside a first side of the housing.

16. A versatile measuring device capable of measuring in three dimensions, comprising:
   a rigid housing including at a bottom thereof a base compass associated with the base capable of rotating around a pivot in a to-dimensional plane,
   a drum having a coiled tape inside the drum, the tape marked with units of measurement,
   the housing containing a series of sections on an exterior of the housing so that an arc traversing the series of sections covers approximately ninety rotational degrees corresponding to a portion of the ninety rotational degrees,
   a driving member connected either to the tape or the drum and accessible to a user
   the tape capable of being extended outside said housing at a variety of angles by rotating up to approximately 90 degrees in a third dimension at an angle to the two-dimensional plane, an amount of the tape's rotation being adjustable by manipulation of the driving member,
   wherein the tape has at a narrow distal end thereof a marker and a movable pivot, the movable pivot for creating a second center so that the marker can mark off an arc of points equidistant from said movable pivot.

17. The measuring device of claim 16, including a level on a top portion of the housing.

18. The measuring device of claim 16, wherein the marker has a groove for holding a writing instrument.

19. The measuring device of claim 14, wherein the compass is capable of rotating up to approximately 180 degrees.

20. The measuring device of claim 14, wherein the movable pivot, when moved from the narrow distal end toward a proximal end, bends the tape so that the tape acquires a "U"-shaped cross-section thereby increasing an extendibility of the tape.

21. The measuring device of claim 19, including a level on a top portion of the housing.

22. The measuring device of claim 21, wherein the compass is capable of rotating up to approximately 180 degrees.

23. The measuring device of claim 16, wherein the driving member is an axle member having at least one arm at a first end thereof, the axle member rubbing through at least a portion of the drum and the coiled tape, the at least one arm extending outside a first side of the housing. 22. (new) Tb. measuring device of claim 8, wherein the driving member is an axle member having at least one arm at a first end thereof, the aide member rubbing through at least a portion of the drum and the coiled tape, the at least one arm extending outside a first side of the housing. 23. (new) The measuring device of claim 14. wherein the driving member is an axle member having at least one arm at a first end thei-eof~ the axle member rubbing through at least a portion of the dnam and th. coiled tape. the at least one arni extending outside a first side of the housing.

* * * * *